United States Patent
Kanda

(10) Patent No.: US 7,508,148 B2
(45) Date of Patent: Mar. 24, 2009

(54) VEHICLE STEERING APPARATUS

(75) Inventor: Koji Kanda, Okazaki (JP)

(73) Assignee: Koyo Seiko Co., Ltd., Osaka (JP)

( * ) Notice: Subject to any disclaimer, the term of this patent is extended or adjusted under 35 U.S.C. 154(b) by 351 days.

(21) Appl. No.: 10/694,884

(22) Filed: Oct. 29, 2003

(65) Prior Publication Data
US 2004/0090199 A1    May 13, 2004

(30) Foreign Application Priority Data
Oct. 30, 2002    (JP)    ............................. 2002-315513

(51) Int. Cl.
*H02P 7/00*    (2006.01)
*H02K 17/32*    (2006.01)

(52) U.S. Cl. .................. 318/432; 318/433; 318/34; 318/66; 180/402

(58) Field of Classification Search ......... 318/432–434, 318/701; 180/408, 412–415, 422–423, 443–446
See application file for complete search history.

(56) References Cited

U.S. PATENT DOCUMENTS

| | | | | |
|---|---|---|---|---|
| 4,924,166 A * | 5/1990 | Roussel | .................... | 318/608 |
| 5,467,280 A * | 11/1995 | Kimura | .................... | 701/37 |
| 5,765,661 A * | 6/1998 | Matsuoka | .................... | 180/446 |
| 5,844,387 A * | 12/1998 | Mukai et al. | ................ | 180/446 |
| 5,908,457 A * | 6/1999 | Higashira et al. | ............. | 701/41 |
| 6,008,599 A * | 12/1999 | Beck | .................... | 318/254 |
| 6,012,736 A * | 1/2000 | Hansen et al. | .............. | 280/735 |
| 6,032,756 A * | 3/2000 | Nishimura et al. | .......... | 180/446 |
| 6,032,757 A * | 3/2000 | Kawaguchi et al. | ......... | 180/446 |
| 6,097,286 A * | 8/2000 | Discenzo | .................... | 340/465 |
| 6,161,068 A * | 12/2000 | Kurishige et al. | ............. | 701/41 |
| 6,308,122 B1 * | 10/2001 | Nishizaki et al. | ............. | 701/41 |
| 6,449,543 B2 * | 9/2002 | Nishizaki et al. | ............. | 701/41 |
| 6,505,703 B2 * | 1/2003 | Stout et al. | .................. | 180/446 |
| 6,580,989 B1 * | 6/2003 | Husain et al. | ................ | 701/41 |
| 6,655,490 B2 * | 12/2003 | Andonian et al. | ........... | 180/402 |
| 6,681,881 B2 * | 1/2004 | Andonian et al. | ........... | 180/402 |
| 6,831,477 B2 * | 12/2004 | Fukusumi et al. | ........... | 324/772 |

(Continued)

FOREIGN PATENT DOCUMENTS

JP    8-258732 A    10/1996

(Continued)

*Primary Examiner*—Walter Benson
*Assistant Examiner*—Renata McCloud
(74) *Attorney, Agent, or Firm*—Birch, Stewart, Kolasch & Birch LLP

(57) ABSTRACT

A current sensor 8a detects a motor current of a steering motor 5 which supplies a steering mechanism 1 with steering force corresponding to the steering amount applied to a steering wheel 2. A main controller 4 extracts component within a predetermined frequency range out of a motor current detected by the current sensor 8a, amplifies the extracted component and drives a reaction force motor 3 in a controlled manner so as to supply the steering wheel 2 with steering reaction force corresponding to the steering amount applied to the steering wheel 2 and steering reaction force corresponding to a current of the component, which has been extracted and amplified. The vehicle steering apparatus constructed as above can supply steering means with steering reaction force corresponding to component within a predetermined frequency range of a motor current of the steering motor.

4 Claims, 6 Drawing Sheets

U.S. PATENT DOCUMENTS

| | | | |
|---|---|---|---|
| 2001/0011201 A1* | 8/2001 | Nishizaki et al. | 701/41 |
| 2002/0063543 A1* | 5/2002 | Kanda | 318/433 |
| 2002/0129988 A1* | 9/2002 | Stout et al. | 180/400 |

FOREIGN PATENT DOCUMENTS

| | | |
|---|---|---|
| JP | 9-142330 A | 6/1997 |
| JP | 10-217988 A | 8/1998 |
| JP | 10-258751 A | 9/1998 |
| JP | 10-310075 A | 11/1998 |
| JP | 11-59469 A | 3/1999 |

\* cited by examiner

VEHICLE STEERING APPARATUS

This Nonprofessional application claims priority under 35 U.S.C. § 119(a) on Patent Application No(s). 2002-315513 filed in Japan on Oct. 30, 2002, the entire contents of which are hereby incorporated by reference.

BACKGROUND OF THE INVENTION

1. Field of the Invention

The present invention relates to a vehicle steering apparatus which supplies steering means with steering reaction force corresponding to a steering amount, which is the amount of a steering operation performed by the driver.

2. Description of Related Art

Known as one of steering apparatuses for vehicles is a steer-by-wire steering apparatus wherein a steering wheel which functions as steering means and a steering mechanism are not connected mechanically with each other. Such a steer-by-wire steering apparatus is disclosed in Japanese Patent Application Laid-Open No. H10-258751 (1998), for example. The steer-by-wire steering apparatus disclosed therein has a steering wheel arranged in a mechanically separated manner from a steering mechanism, and an actuator for steering (electric motor) is provided at the steering mechanism. The electric motor is driven in a controlled manner by controlling means constituted of a microprocessor on the basis of detection results of the steering amount of the steering wheel (steering angle and steering direction), thereby realizing steering corresponding to the steering amount of the steering wheel.

A reaction force actuator (electric motor) is attached to the steering wheel which is not connected mechanically with the steering mechanism. The reaction force actuator is driven in a controlled manner with reaction force instructing signals outputted from the controlling means on the basis of detection results of the steering amount of the steering wheel and the vehicle speed, for example. The reaction force actuator supplies the steering wheel with reaction force directing the steering wheel towards the neutral position thereof. The reaction force changes in intensity in response to changes in the steering amount and in the vehicle speed. Such a structure allows a driver to steer the vehicle with similar feeling to that of a general steering apparatus in which a steering wheel and a steering mechanism are connected mechanically with each other.

Drive of the reaction force actuator (electric motor) is controlled on the basis of vehicle information, such as the steering amount of the steering wheel (steering angle), a vehicle speed, a yaw rate and a lateral acceleration. Since the steering angle, vehicle speed, yaw rate or lateral acceleration seldom changes drastically in a short time, drive of the reaction force motor is controlled mainly on the basis of vehicle information within a low frequency band (a frequency between 2 Hz and 3 Hz or lower, for example). On the other hand, the roughness of the road surface or the like often changes in a short time, in a high frequency band (between 3 Hz and 15 Hz, for example). Since mainly used for drive control of the reaction force motor is vehicle information within a low frequency band, reaction force in response to the roughness of the road surface or the like cannot be transmitted to the driver satisfactorily.

BRIEF SUMMARY OF THE INVENTION

The present invention has been made with the aim of solving the above problem, and it is an objective thereof to provide a vehicle steering apparatus which supplies steering means with steering reaction force corresponding to component within a predetermined frequency range of motor current of a steering motor so as to improve the steering feeling.

Another objective of the present invention is to provide a vehicle steering apparatus which can control the amplification factor of component within a predetermined frequency range of motor current of the steering motor, thereby adjusting the intensity of steering reaction force to be applied to the steering means, which reaction force corresponds to said component.

Yet another objective of the present invention is to provide a vehicle steering apparatus which supplies steering means with steering reaction force corresponding to component within a frequency range between 3 Hz and 15 Hz, which corresponds to the roughness of the road surface, of motor current of the steering motor, so as to improve the steering feeling.

A vehicle steering apparatus according to the present invention uses a steering motor to supply a steering mechanism with steering force corresponding to the steering amount applied to steering means and uses a reaction force motor to supply the steering means with steering reaction force corresponding to the steering amount. The vehicle steering apparatus comprises: current detecting means for detecting a motor current of the steering motor; extracting means for extracting component within a predetermined frequency range out of the motor current detected by the current detecting means; and reaction force motor driving means for driving the reaction force motor so as to supply the steering means with steering reaction force corresponding to the component extracted by the extracting means and steering reaction force corresponding to the steering amount. The frequency range to be extracted by the extracting means can be set at a relatively high frequency range which corresponds to a change in the roughness of the road surface or the like, for example.

This vehicle steering apparatus extracts component within a predetermined frequency range corresponding to a change in the roughness of the road surface or the like, for example, out of the motor current of the steering motor and supplies the steering means with steering reaction force corresponding to the extracted component, so that steering reaction force within a high frequency band corresponding to the roughness of the road surface or the like, which cannot be transmitted to the driver satisfactorily in the conventional technique, can be transmitted to the driver, thereby improving the steering feeling.

The vehicle steering apparatus according to the present invention may further comprise amplifying means for amplifying the component extracted by the extracting means. When the frequency range extracted by the extracting means is a frequency range corresponding to a change in the roughness of the road surface or the like, for example, it becomes possible to change the amplification factor of the amplifying means so as to control the steering reaction force to be applied to the steering means, which reaction force corresponds to the roughness of the road surface or the like.

This vehicle steering apparatus extracts and amplifies component within a relatively high frequency range such as the roughness of the road surface or the like, for example, out of the motor current of the steering motor, so that the intensity of the steering reaction force corresponding to the roughness of the road surface or the like which is transmitted to the driver can be adjusted by changing the amplification factor.

Regarding the vehicle steering apparatus according to the present invention, the predetermined range may be a range between 3 Hz and 15 Hz.

In this vehicle steering apparatus, the extracting means extracts component within a frequency range between 3 Hz and 15 Hz out of the motor current of the steering motor detected by the current detecting means, and the reaction force motor driving means drives the reaction force motor so as to supply the steering means with steering force corresponding to the steering amount applied to the steering means and corresponding to the component extracted by the extracting means. By extracting the component within a frequency range between 3 Hz and 15 Hz out of the motor current, it becomes possible to supply the steering means with steering reaction force corresponding to the roughness of the road surface or the like. As a result, it becomes possible to transmit to the driver steering reaction force within a high frequency band corresponding to the roughness of the road surface or the like, which cannot be transmitted to the driver satisfactorily in the conventional technique, thereby improving the steering feeling.

The above and further objectives and features of the invention will more fully be apparent from the following detailed description with accompanying drawings.

DETAILED DESCRIPTION OF THE INVENTION

The following description will explain the present invention with reference to the drawings illustrating an embodiment thereof.

Figure 1:
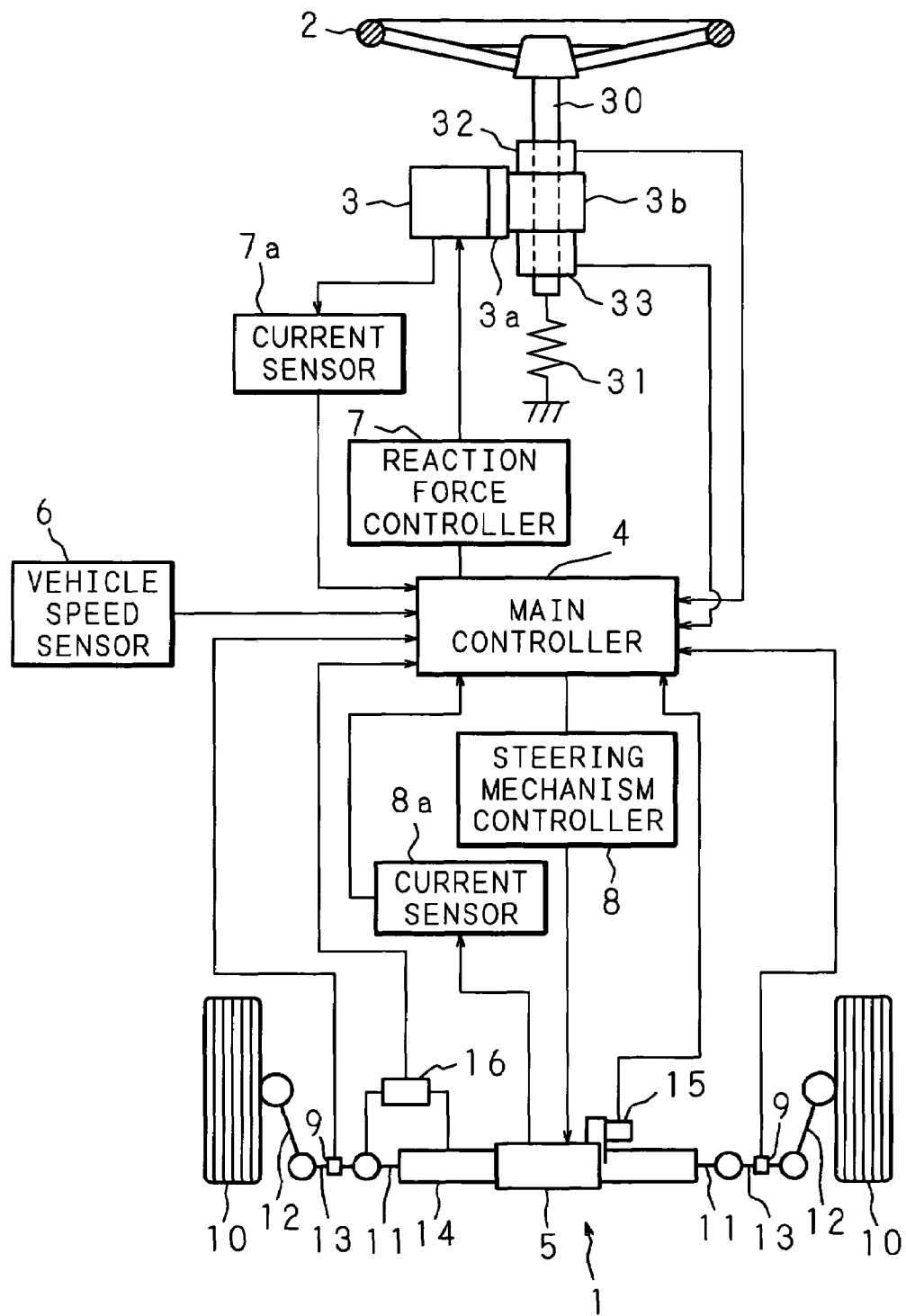
FIG. 1 is a block diagram showing the structure of a vehicle steering apparatus according to the present invention.

FIG. 1 is a block diagram showing the structure of a vehicle steering apparatus according to the present invention. The vehicle steering apparatus shown in FIG. 1 comprises: a steering mechanism 1 for steering the vehicle with a pair of tire wheels for steering 10 arranged on both sides of the vehicle body which is not illustrated in the figure; a steering wheel 2, which functions as steering means, arranged in a mechanically separated manner from the steering mechanism 1; an electric motor (hereinafter referred to as a reaction force motor) 3 for supplying the steering wheel 2 with reaction force; a reaction force controller 7 for driving the reaction force motor 3 in a controlled manner; an electric motor for steering (hereinafter referred to as a steering motor) 5 arranged in the middle of the steering mechanism 1; a steering mechanism controller 8 for driving the steering motor 5 in a controlled manner; and a main controller 4 constituted of a microprocessor. In this structure, the main controller 4 drives the steering motor 5 in response to a steering operation of the steering wheel 2 so as to cause the steering mechanism 1 to operate.

In the steering mechanism 1, as is widely known, knuckle arms 12 for supporting the tire wheels 10 are connected through respective tie rods 13 to the respective ends of a steering shaft 11 which extends from side to side of the vehicle body and slides in the axial direction. When the steering shaft 11 slides in a direction or the other direction, the knuckle arms 12 are pushed or pulled with the tie rods 13 so as to turn the tire wheels 10 to the right or the left. This is performed by transforming rotation of the steering motor 5 provided coaxially in the middle of the steering shaft 11 into slide of the steering shaft 11 by a suitable movement transformation mechanism.

Rotation of the steering shaft 11 on the axis thereof is restrained by rotation restraining means, which is not illustrated in the figure, interposed between the steering shaft 11 and a steering shaft housing 14. The rotation of the steering motor 5 is transformed into axial slide of the steering shaft 11, thereby performing a steering operation (steering of the tire wheels 10) corresponding to the rotation of the steering motor 5. Current flowing in the steering motor 5 (steering motor current) is detected by a current sensor 8a and is supplied to the main controller 4.

A steering angle of the tire wheels 10 is detected by a steering angle sensor 16 on the basis of a relative slide position of the steering shaft 11 with respect to a steering shaft housing 14 on one side of the steering motor 5. The output from the steering angle sensor 16 is supplied to the main controller 4 together with the output from a rotary encoder 15 which detects a rotational position of the steering motor 5. Attached to the tie rods 13 are axial force sensors 9 for detecting an axial force caused by road surface reaction force which the tire wheels 10 receive from the road surface, and the respective output from the axial force sensors 9 is supplied to the main controller 4.

The reaction force motor 3 (DC motor, for example) for supplying the steering wheel 2 with reaction force is fixedly attached to a housing of a rotary shaft 30. Rotation of the reaction force motor 3 is transmitted to the rotary shaft 30 through an electromagnetic clutch 3a with the rotation direction being transformed by a worm gear mechanism 3b. The steering wheel 2 is fixed to one end of the rotary shaft 30 coaxially. The other end of the rotary shaft 30 is coupled to a suitable portion of the vehicle body, which is not illustrated in the figure, through a torsion spring 31 having a predetermined elasticity.

The reaction force motor 3 is driven in both directions by energization from the reaction force controller 7 in response to a reaction force instructing signal which is supplied from the main controller 4, so as to supply the steering wheel 2 attached to one end of the rotary shaft 30 with force (reaction force) in a direction opposite to the operational direction of the steering wheel 2. Consequently, it is required for rotating the steering wheel 2 to apply a steering torque against the reaction force generated by the reaction force motor 3. The steering torque applied to the steering wheel 2 is detected by a torque sensor 32 and the detection result is supplied to the main controller 4.

The steering amount (steering angle) and the operational direction of the steering wheel 2 are detected by a rotary encoder 33. The detection result is supplied to the main controller 4. Moreover, a current flowing in the reaction force motor 3 (reaction force motor current) is detected by the current sensor 7a and is supplied to the main controller 4.

When the above-mentioned rotation is stopped, the torsion spring 31 interposed between the other end of the rotary shaft 30 and a part of the vehicle body causes, with the elasticity thereof, the rotary shaft 30 to rotate and causes the steering wheel 2 to return to a predetermined neutral position. The returning movement is required to make the steering wheel 2 return in accordance with a returning operation of the tire wheels 10 to a straight-running direction, which operation is generated at the mechanically separated steering mechanism 1.

As described above, the state of steering which actually occurs at the steering mechanism 1 is supplied to the main controller 4 as an input which is transmitted from the rotary encoder 15 and the steering angle sensor 16. Moreover, the state of operation at the steering wheel 2, which functions as steering means, is supplied to the main controller 4 as an input which is transmitted from the torque sensor 32 and the rotary encoder 33. Furthermore, an output from a vehicle speed sensor 6 which detects the running speed of the vehicle is supplied to the main controller 4.

An output from the main controller 4 is supplied to the reaction force controller 7 for supplying the steering wheel 2 with reaction force and a steering mechanism controller 8 for performing a steering operation with the steering mechanism 1, and the reaction force controller 7 and the steering mechanism controller 8 are designed to perform respective control operations in response to an instructing signal from the main controller 4. The main controller 4 determines a target reaction force to be supplied to the steering wheel 2 on the basis of the steering amount (steering angle) of the steering wheel 2 supplied from the rotary encoder 33 and the vehicle speed supplied from the vehicle speed sensor 6, for example, and performs a reaction force control operation by supplying the reaction force controller 7 with a reaction force instructing signal so as to generate a target reaction force.

Moreover, the main controller 4 determines a target value (target steering angle) of a steering angle (detected by the steering angle sensor 16) of the steering mechanism 1 on the basis of the steering amount (steering angle) of the steering wheel 2 supplied from the rotary encoder 33 and the vehicle speed supplied from the vehicle speed sensor 6, and performs a steering control operation by driving the steering motor 5 until the target steering angle is obtained. Here, the input from the rotary encoder 15 is used as a feedback signal which is used for checking whether or not the steering motor 5 has reached a required rotational position.

Figure 2:
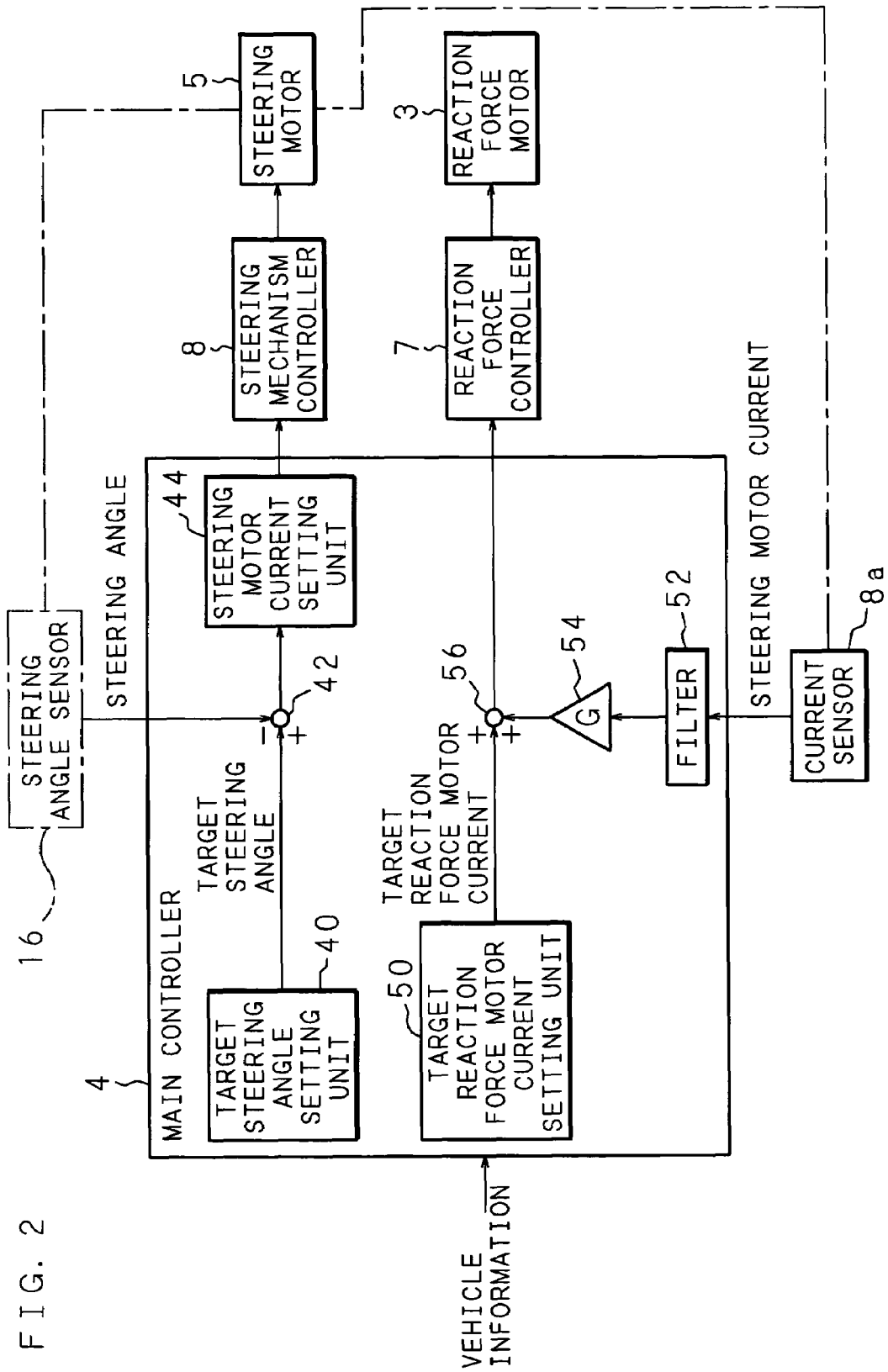
FIG. 2 is a block diagram showing an example of the function of a main controller in a conceptional manner.

FIG. 2 is a block diagram showing the function of the main controller 4 in a conceptional manner. As mentioned above, vehicle information such as a steering torque, a steering angle, a reaction force motor current, a steering motor current, a rotational position of the motor, a steering angle, an axial force and a vehicle speed is inputted into the main controller 4. The main controller 4 comprises: a target steering angle setting unit 40 for setting a target steering angle; a subtracting unit 42 for calculating a difference between the target steering angle set by the target steering angle setting unit 40 and a steering angle detected by the steering angle sensor 16; and a steering motor current setting unit 44 which sets a steering motor current for reducing the difference (deviation) between the target steering angle and the detected steering angle. The main controller 4 supplies the steering mechanism controller 8 with the set steering motor current so as to drive the steering motor 5 in a controlled manner.

The main controller (reaction force motor driving means) 4 further comprises: a target reaction force motor current setting unit 50 for setting a target reaction force motor current; a filter (extracting means) 52 for extracting component within a predetermined frequency range (between 3 Hz and 15 Hz, for example) out of the steering motor current detected by the current sensor 8a; an amplifier (amplifying means) 54 for amplifying the current of the component extracted by the filter 52; and an adding unit 56 for adding the amplified current and the set target reaction force motor current. The main controller 4 supplies the reaction force controller 7 with a target reaction force motor current which has been obtained by the addition, so as to drive the reaction force motor 3 in a controlled manner. Here, the component within a frequency range between 3 Hz and 15 Hz of the steering motor current corresponds to a frequency band of the roughness of the road surface.

The following description will explain the operation of the vehicle steering apparatus constructed as above, with reference to some flow charts.

Figure 3:
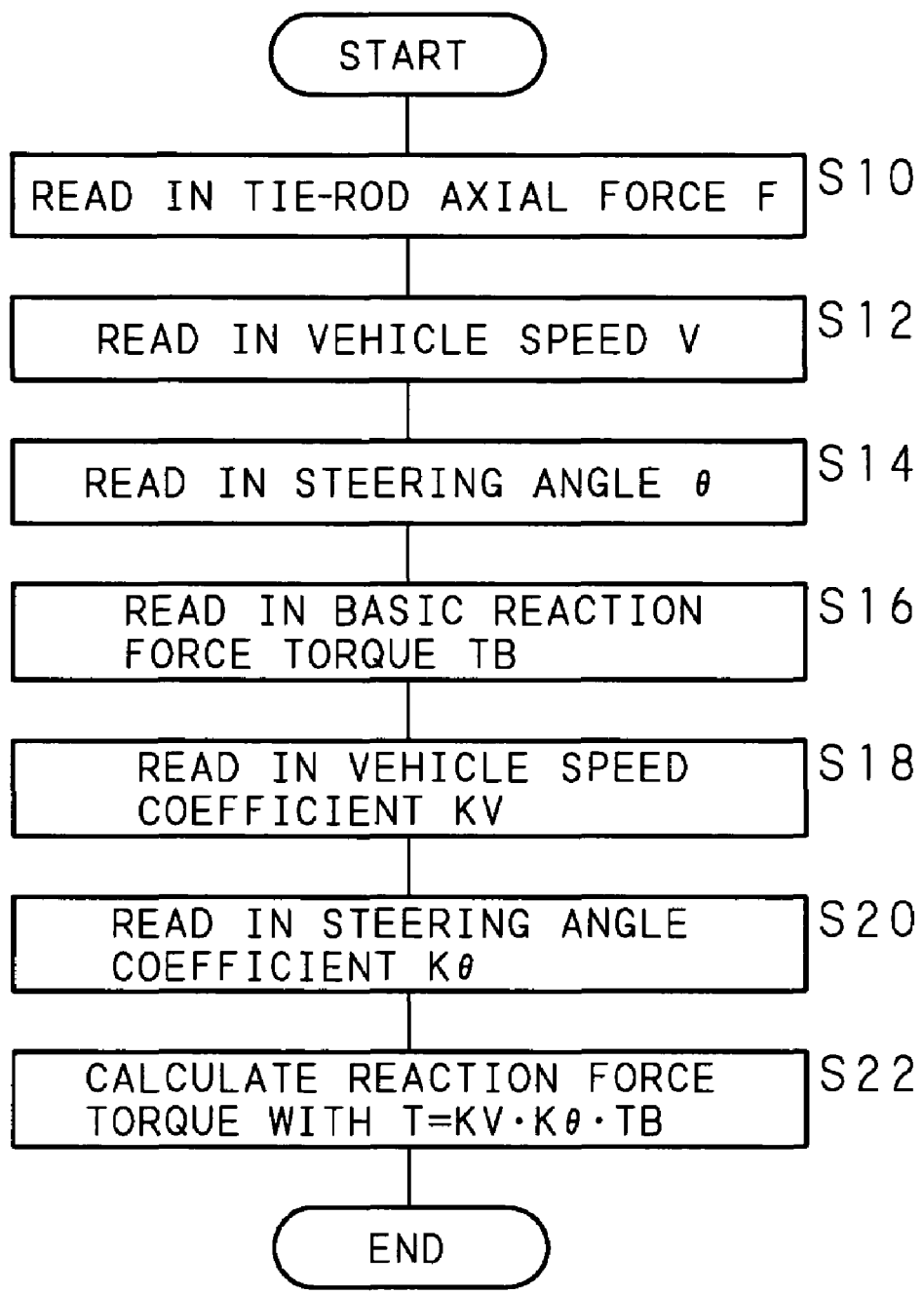
FIG. 3 is a flow chart showing the operation of the main controller for calculating a reaction force torque.

FIG. 3 is a flow chart showing the operation of the main controller 4 for calculating a reaction force torque T. The main controller 4 reads in an axial force F of the tie rod 13, which has been detected by the axial force sensor 9, (step S10) and reads in a vehicle speed V detected by the vehicle speed sensor 6 (step S12). The main controller 4 then reads in a steering amount (steering angle) θ of the steering wheel 2 from an output of the rotary encoder 33 (step S14).

Figure 4A:
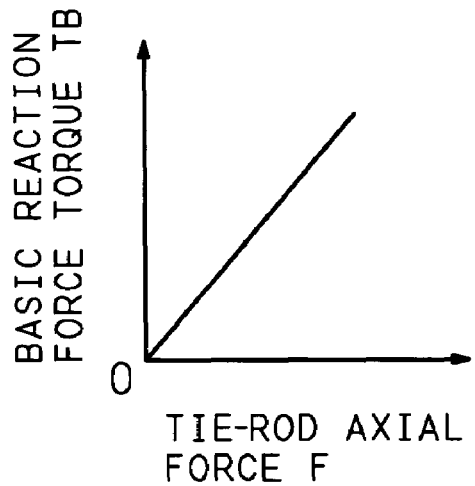
FIG. 4A is a figure showing the basic reaction force torque TB—tie-rod axial force F characteristic, which is to be used for calculating a reaction force torque.
Figure 4B:
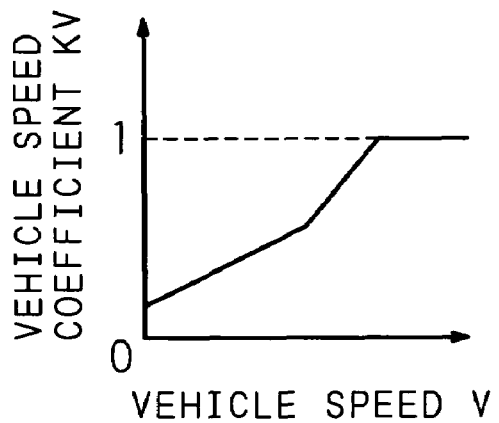
FIG. 4B is a figure showing the vehicle speed coefficient KV—Vehicle speed V characteristic, which is to be used for calculating a reaction force torque.

The main controller 4 then reads in a basic reaction force torque TB corresponding to a tie-rod axial force F from a table storing a tie-rod axial force F—basic reaction force torque TB characteristic, wherein the basic reaction force torque TB is in proportion to the tie-rod axial force F as shown in FIG. 4A (step S16). The main controller 4 then reads in a vehicle speed coefficient KV corresponding to a vehicle speed V from a table storing a vehicle speed coefficient KV—vehicle speed V characteristic, wherein the vehicle speed coefficient KV has the minimum value slightly larger than zero, increases moderately at a speed lower than a predetermined speed, increases rapidly at a speed higher than the predetermined speed and has the maximum value of 1 as shown in FIG. 4B (step S18).

Figure 4C:
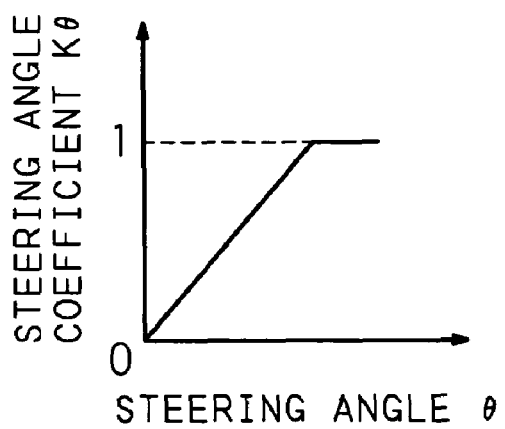
FIG. 4C is a figure showing the steering angle coefficient Kθ—Steering angle θ characteristic, which is to be used for calculating a reaction force toque.

The main controller 4 then reads in a steering angle coefficient Kθ corresponding to a steering angle θ from a table storing a steering angle coefficient Kθ—steering angle θ characteristic, wherein the steering angle coefficient Kθ is in proportion to the steering angle θ at a steering angle θ smaller than a predetermined steering angle θ and has a value of 1 at a steering angle θ larger than the predetermined steering angle θ as shown in FIG. 4C (step S20). The main controller 4 then calculates a reaction force torque T using the equation, T=KV*Kθ*TB (step S22). The main controller 4 (target reaction force motor current setting unit 50) sets a target reaction force motor current corresponding to the calculated reaction force torque. It should be noted that the above-mentioned tables are stored in the main controller 4 or in a ROM connected with the main controller 4, for example.

Figure 5:
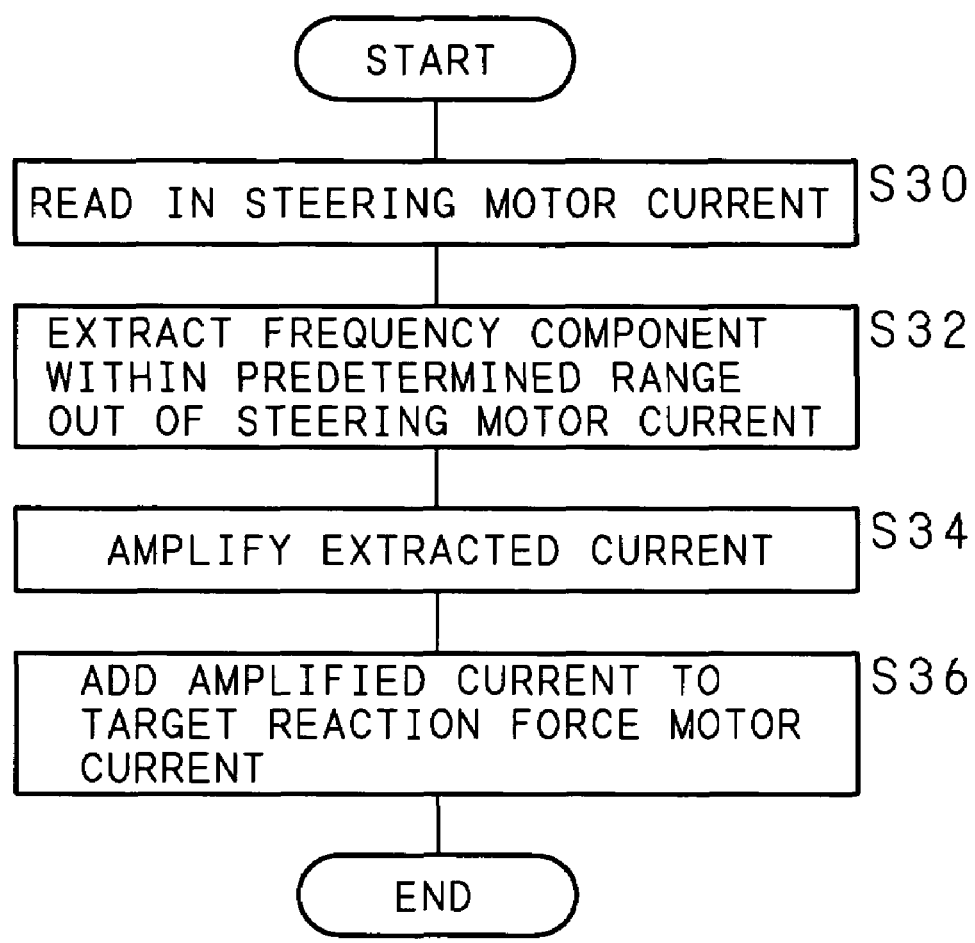
FIG. 5 is a flow chart showing the operation for driving the reaction force motor.
Figure 6:
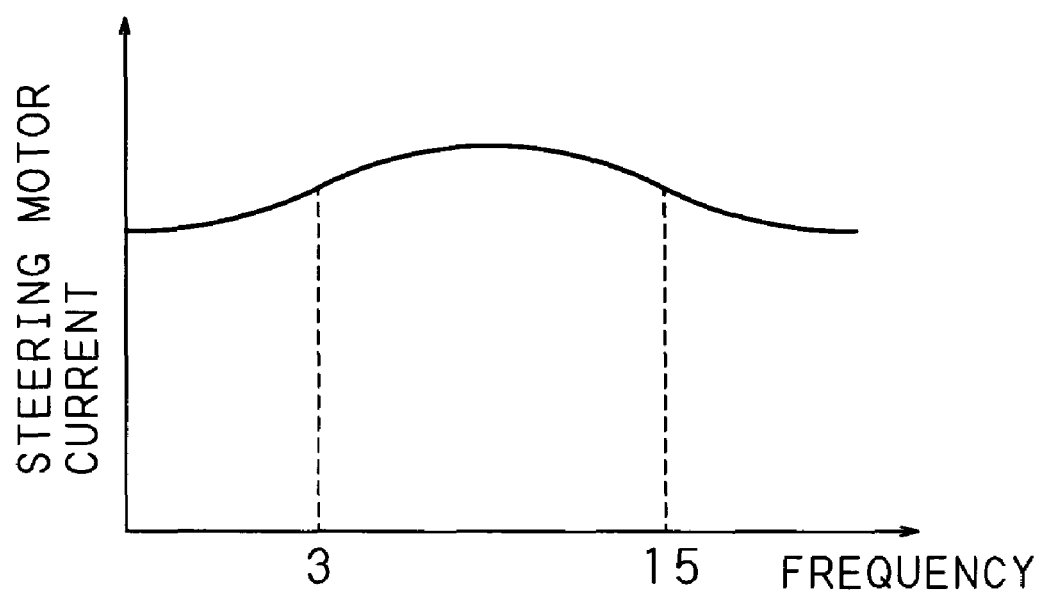
FIG. 6 is a figure showing an example of extraction of a range between 3 Hz and 15 Hz out of the steering motor current.

FIG. 5 is a flow chart showing the operation of the main controller 4 for driving the reaction force motor. The main controller 4 sets a target reaction force motor current, reads in a steering motor current (step S30), extracts component within a frequency range between 3 Hz and 15 Hz out of the steering motor current as shown in FIG. 6 (step S32), amplifies a current of the extracted component (step S34), adds the amplified current to the set target reaction force motor current (step S36), supplies the reaction force controller 7 with a target reaction force motor current which has been obtained by the addition, and drives the reaction force motor 3 in a controlled manner.

Although a current extracted by the filter 52 is amplified by the amplifier 54 in the above embodiment, the amplifier 54 may be omitted. Moreover, the amplification factor of the amplifier 54 can be set at any value. For example, the amplification factor may be fixed, or may be increased and decreased on the basis of a vehicle speed (the amplification factor may be low when the vehicle speed is high). Moreover, it is also possible to switch on/off the addition of the adding unit 56. When the addition is switched off, there arises a problem like the conventional technique that the reaction force corresponding to the roughness of the road surface cannot be transmitted to the steering wheel 2 satisfactorily.

Moreover, the range of the frequency extracted from the steering motor current is not limited to a range between 3 Hz and 15 Hz, but can be set at any frequency range. For example, the range of the extracted frequency may be fixed, or may be increased and decreased on the basis of the vehicle speed (a range between 3 Hz and 9 Hz with a high vehicle speed and a range between 3 Hz and 15 Hz with a low vehicle speed, for example).

It should be noted that the above embodiment is an example of a vehicle steering apparatus according to the invention, and is not aimed to limit the structure of the reaction force motor 3 which functions as a reaction force actuator and the steering motor 5. Moreover, it should be understood that other steering means such as a lever or a joy stick can be employed as steering means instead of the steering wheel 2.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A vehicle steering apparatus which uses a steering motor to supply a steering mechanism with steering force corresponding to a steering amount applied to a steering member, comprising:
   a reaction force motor supplying the steering member with steering reaction force;
   a vehicle speed sensor detecting a vehicle running speed;
   a current sensor detecting a motor current of the steering motor; and
   a controller performing operations of:
   extracting a component within a predetermined frequency range out of the detected motor current, said predetermined frequency range increasing and decreasing based on the detected vehicle running speed and having a lower limit of 3 Hz and an upper limit of 9 Hz at high vehicle speed and an upper limit of 15 Hz at low vehicle speed;
   amplifying the extracted component with an amplification factor which increases as detected vehicle running speed decreases and decreases as detected vehicle running speed increases;
   calculating said steering reaction force by
   setting a target value of a steering reaction force which corresponds to the steering amount; and
   adding to said target value the extracted and amplified component; and
   driving the reaction force motor so as to supply the steering member with the calculated steering reaction force.

2. The vehicle steering apparatus according to claim 1, wherein the steering member and the steering mechanism are not connected mechanically with each other.

3. A vehicle steering apparatus which uses a steering motor to supply a steering mechanism with steering force corresponding to a steering amount applied to steering means, comprising:
   a reaction force motor for supplying the steering means wit steering reaction force;
   vehicle speed sensing means for detecting a vehicle running speed;
   current detecting means for detecting a motor current of the steering motor;
   extracting means for extracting a component within a predetermined frequency range out of the detected motor current, said predetermined frequency range increasing and decreasing based on the detected vehicle running speed and having a lower limit of 3 Hz and an upper limit of 9 Hz at high vehicle speed and an upper limit of 15 Hz at low vehicle speed;
   amplifying means for amplifying the extracted component with an amplification factor which increases as detected vehicle running speed decreases and decreases as detected vehicle running speed increases;
   calculating means for calculating steering reaction force by
   means for setting a target value of a steering reaction force which corresponds to the steering amount; and
   adding means for adding to said target value the component extracted and amplified by the extracting means, and
   reaction force motor driving means for driving the reaction force motor so as to supply the steering means with the calculated steering reaction force.

4. The vehicle steering apparatus according to claim 3, wherein the steering means and the steering mechanism are not connected mechanically with each other.

* * * * *